United States Patent
Taverner et al.

(10) Patent No.: US 10,338,336 B1
(45) Date of Patent: Jul. 2, 2019

(54) FIBER OPTIC CABLE FOR INHIBITING BREACHING FLUID FLOW

(71) Applicant: Weatherford Technology Holdings, LLC, Houston, TX (US)

(72) Inventors: Domino Taverner, Delray Beach, FL (US); John J. Grunbeck, Northford, CT (US); Jason Scott Kiddy, Gambrills, MD (US)

(73) Assignee: WEATHERFORD TECHNOLOGY HOLDINGS, LLC, Houston, TX (US)

( * ) Notice: Subject to any disclaimer, the term of this patent is extended or adjusted under 35 U.S.C. 154(b) by 0 days.

(21) Appl. No.: 15/864,205

(22) Filed: Jan. 8, 2018

(51) Int. Cl.
   G02B 6/44      (2006.01)
   E21B 17/00     (2006.01)
   E21B 47/12     (2012.01)
   E21B 47/00     (2012.01)

(52) U.S. Cl.
   CPC ............ G02B 6/4492 (2013.01); E21B 17/00 (2013.01); G02B 6/443 (2013.01); G02B 6/4427 (2013.01); E21B 47/00 (2013.01); E21B 47/123 (2013.01)

(58) Field of Classification Search
   CPC .... G02B 6/4492; G02B 6/4427; G02B 6/443; E21B 17/00; E21B 47/00; E21B 47/123
   USPC ....................................................... 385/109
   See application file for complete search history.

(56) References Cited

U.S. PATENT DOCUMENTS

| | | | |
|---|---|---|---|
| 3,641,354 A | 2/1972 | De Ment | |
| 5,178,153 A | 1/1993 | Einzig | |
| 5,657,413 A * | 8/1997 | Ray | B82Y 15/00 385/100 |
| 5,857,255 A | 1/1999 | Wichmann | |
| 6,233,374 B1 | 5/2001 | Ogle et al. | |
| 7,646,953 B2 | 1/2010 | Dowd et al. | |
| 7,715,672 B2 * | 5/2010 | Dong | C03B 37/01211 385/109 |
| 7,916,989 B2 * | 3/2011 | Bringuier | G02B 6/4483 385/109 |
| 8,982,673 B2 | 3/2015 | Goeller et al. | |
| 9,658,417 B2 | 5/2017 | Kordahi | |
| 9,784,049 B2 | 10/2017 | Sherman | |

(Continued)

FOREIGN PATENT DOCUMENTS

WO    00/05612 A1    2/2000

OTHER PUBLICATIONS

International Search Report and Written Opinion dated Apr. 3, 2019, in corresponding Application No. PCT/US2018/065664.

*Primary Examiner* — Jerry M Blevins
(74) *Attorney, Agent, or Firm* — Patterson + Sheridan, LLP

(57) ABSTRACT

Fiber optic cables suitable for use in downhole applications, with one or more features for inhibiting flow of any fluid breaching an armor layer of the optical cable are provided. By preventing, or at least impeding, fluid flow along the cable length, any breaching fluid may be confined to a small region of the cable, which may significantly reduce the deleterious effects (e.g., hydrogen darkening) of an armor layer breach. One example optical cable generally includes one or more optical fibers, an inner tube surrounding the one or more optical fibers, an outer tube surrounding the inner tube, and one or more polymer sealing features disposed in an annulus between the outer tube and the inner tube and bonded to at least one of the inner tube or the outer tube to prevent fluid flow in the annulus along at least a portion of a length of the optical cable.

7 Claims, 8 Drawing Sheets

(56) References Cited

U.S. PATENT DOCUMENTS

| | | | |
|---|---|---|---|
| 2012/0076464 A1* | 3/2012 | Dowd | G02B 6/4492 |
| | | | 385/109 |
| 2012/0111104 A1 | 5/2012 | Taverner et al. | |
| 2016/0011066 A1 | 1/2016 | Taverner et al. | |
| 2016/0153246 A1* | 6/2016 | Brown | E21B 47/1015 |
| | | | 166/250.12 |
| 2016/0159000 A1* | 6/2016 | Swinehart | B29C 65/02 |
| | | | 427/163.2 |
| 2017/0199383 A1* | 7/2017 | Machida | G02F 1/163 |

* cited by examiner

US 10,338,336 B1

FIBER OPTIC CABLE FOR INHIBITING BREACHING FLUID FLOW

FIELD OF THE DISCLOSURE

Aspects of the present disclosure generally relate to optical communications and, more particularly, to fiber optic cables for use in harsh environments, such as high pressure, high temperature hydrocarbon recovery applications.

DESCRIPTION OF THE RELATED ART

With advancements in the area of fiber optic sensors for use in harsh environments, there is an increasing need for fiber optic cables compatible with the harsh environmental conditions present in downhole oil and gas applications. For example, fiber optic cables utilized in downhole sensing applications should be able to operate reliably in conditions that may include temperatures in excess of 300° C., static pressures in excess of 138,000 kilopascal (kPa), vibration, corrosive chemistry, and the presence of high partial pressures of hydrogen. Hydrogen tends to degrade the optical properties of the fibers in an optical cable, causing undesired attenuation known as hydrogen darkening.

SUMMARY OF THE DISCLOSURE

Certain aspects of the present disclosure provide an optical cable suitable for downhole use. The optical cable generally includes one or more optical fibers, an inner tube surrounding the one or more optical fibers, an outer tube surrounding the inner tube, and one or more polymer sealing features disposed in an annulus between the outer tube and the inner tube and bonded to at least one of the inner tube or the outer tube to prevent fluid flow in the annulus along at least a portion of a length of the optical cable.

Certain aspects of the present disclosure provide an optical cable suitable for downhole use. The optical cable generally includes one or more optical fibers; an inner tube surrounding the one or more optical fibers; an outer tube surrounding the inner tube; a filler material disposed in at least one of the inner tube or an annulus between the outer tube and the inner tube, along at least a portion of a length of the optical cable; and a plurality of feedthroughs configured to encapsulate the filler material in the at least one of the inner tube or the annulus, wherein the filler material is configured to impede the flow of an ingressing fluid along the at least the portion of the length of the optical cable.

Certain aspects of the present disclosure provide an optical cable suitable for downhole use. The optical cable generally includes one or more optical fibers, an inner tube surrounding the one or more optical fibers, and an outer tube surrounding the inner tube and configured to form one or more fluid-tight annular seals with the inner tube to prevent fluid flow in an annulus between the outer tube and the inner tube, along at least a portion of a length of the optical cable.

BRIEF DESCRIPTION OF THE DRAWINGS

So that the manner in which the above-recited features of the present disclosure can be understood in detail, a more particular description, briefly summarized above, may be had by reference to various aspects, some of which are illustrated in the appended drawings. It is to be noted, however, that the appended drawings illustrate only typical aspects of this disclosure and are therefore not to be considered limiting of its scope, for the disclosure may admit to other equally effective aspects.

To facilitate understanding, identical reference numerals have been used, wherever possible, to designate identical elements that are common to the figures. It is contemplated that elements disclosed in one aspect may be beneficially utilized in other aspects without specific recitation.

DETAILED DESCRIPTION

Certain aspects of the present disclosure provide fiber optic cables suitable for use in downhole applications, with one or more features for inhibiting flow of any fluid breaching an armor layer of the optical cable. By preventing, or at least impeding, fluid flow along at least a portion of a length of the optical cable, any breaching fluid may be confined to a small region of the cable, which may significantly reduce the effects of an armor layer breach. These effects may include corrosion and the resulting production of hydrogen, which may lead to hydrogen darkening of the optical fibers.

Figure 1:
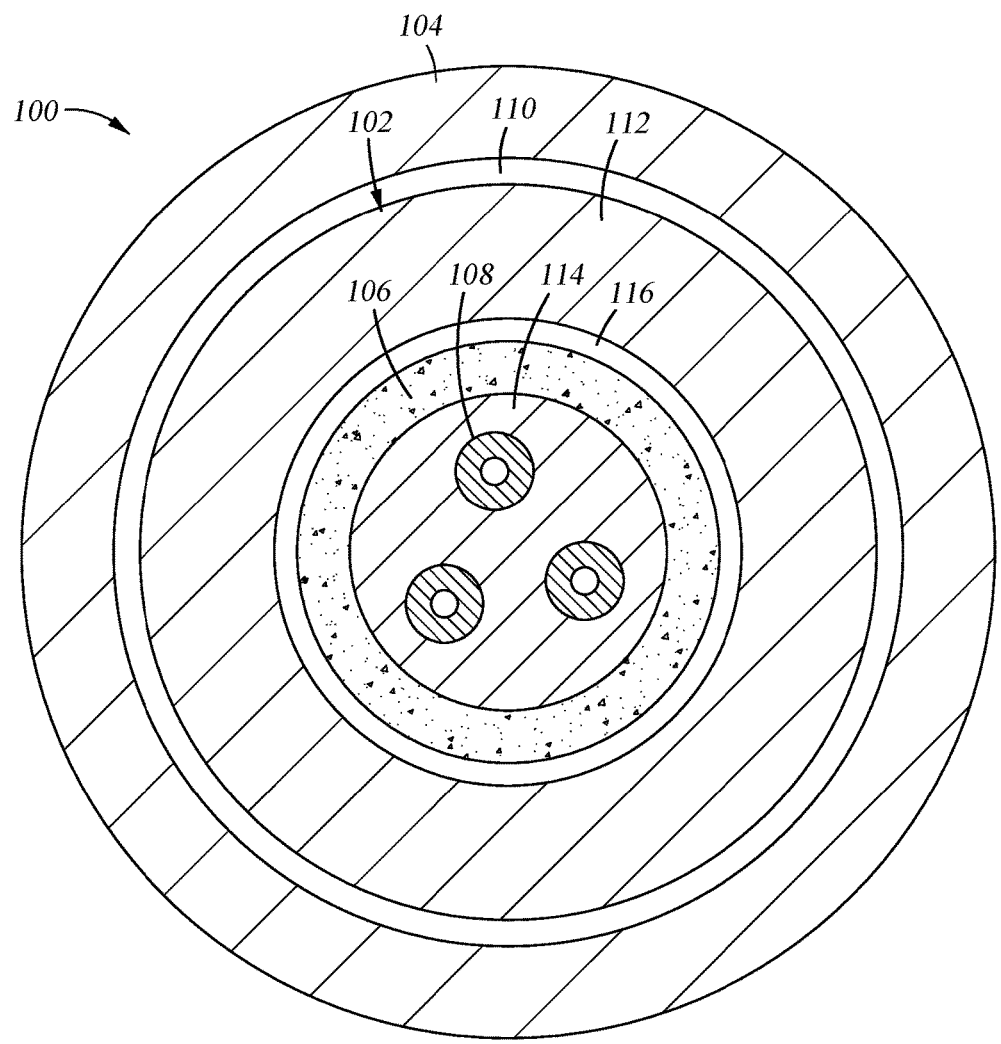
FIG. 1 is a transverse cross-sectional view of a conventional fiber optic cable suitable for use in downhole oil and gas applications.

FIG. 1 is a cross-sectional view of a conventional fiber optic cable 100 suitable for use in harsh environments, such as downhole oil and gas applications. The fiber optic cable 100 may be similar to fiber optic cables disclosed in U.S. Pat. No. 7,646,953 to Dowd et al., entitled "Fiber Optic Cable Systems and Methods to Prevent Hydrogen Ingress" and issued Jan. 12, 2010, herein incorporated by reference in its entirety. The fiber optic cable 100 includes a fiber in metal tube (FIMT) core 102 surrounded by an outer tube 104. The FIMT core 102 includes an inner tube 106 surrounding one or more optical fibers 108. Although three optical fibers 108 are shown disposed within the inner tube 106 in FIG. 1, the FIMT core 102 may include more or less than three optical fibers. A filler material 114 is disposed in the inner tube 106 and substantially fills the void spaces within the inner tube surrounding the optical fibers 108 to support and prevent the optical fibers 108 from moving excessively within the inner tube 106. The filler material 114 may also include a hydrogen absorbing/scavenging material to minimize the effects of hydrogen on the optical performance of the optical fibers 108.

A buffer material 112 is disposed between the outer tube 104 and the inner tube 106. The buffer material 112 provides a mechanical link between the inner tube 106 and the outer tube 104 to prevent the inner tube 106 from sliding within the outer tube 104. Additionally, the buffer material 112 keeps the inner tube 106 generally centered within the outer tube 104 and protects the inner tube 106 and any coatings formed thereon from damage due to vibrating against the outer tube 104. Separation between the buffer material 112 and the outer tube 104 creates an outer annular flow path 110, whereas spacing between the inner tube 106 and the buffer material 112 provides an inner annular flow path 116. The buffer material 112 isolates the inner annular flow path 116 from the outer annular flow path 110, at least until cross-over is desired.

Conventional optical cable designs may be susceptible to leaks in the outer tube (e.g., through pin holes in the weld seam or abrasion of the armor). Such leaks may allow fluid to enter the optical cable, and this breaching fluid may then propagate within the cable. The propagation of breaching fluid in the cable may cause various problems, such as corrosion of inner layers which produces hydrogen (that can lead to hydrogen darkening of optical fibers located therein), bunching of fibers which produce bend loss, and attacking any polymer materials in the cable assemblies. For example, if hydrogen gas is inside the cable, then this can lead to distributed loss in the optical fibers that will negatively impact the sensing system, particularly for Raman distributed temperature sensing (DTS).

Attempts have been made to mitigate this problem and reduce ingress routes in various ways. For example, an (aluminum) buffer layer may be introduced into fiber optic cables to prevent fluid ingress through the tube walls and hydrogen production. However, cable joints and terminations may still provide a fluid entry point that may be difficult to seal at either end of each cable section. Fluid blockers with fiber feedthroughs can be introduced at cable joints to prevent movement of liquids and, to some extent, gases beyond a given cable section, but may be difficult to make effective against hydrogen, may be time-consuming to install, and may not protect the cable section in which the ingress is actually occurring.

Accordingly, there is a need for a fiber optic cable for use in harsh environments that is less susceptible to the propagation of breaching fluids. Certain aspects of the present disclosure prevent, or at least impede, fluid flow along at least a portion of a length of an optical cable, thereby confining any fluid breaching the cable to a small region thereof.

Fiber Optic Cable with Mechanical Seal

Certain aspects of the present disclosure provide a fluid-tight mechanical annular seal between the armor layer (e.g., the outer tube) and the inner tube. If any fluid breaches the armor layer, the breaching fluid will be confined by the gas-tight and liquid-tight seal between the two layers to a small region of the fiber optic cable, unable to propagate up or down the cable, unlike the propagation that can occur in conventional cable designs. Such a tight mechanical seal significantly reduces the effects of an armor breach in a downhole optical cable.

For certain aspects, the fluid-tight annular seal may be made during the armoring process, for example, by drawing the armor through a die or by roll-reducing, such that the armor layer has a tightly sealed fit to the inner tube along a desired portion of the cable's length. For other aspects, the seal may be created in a post-armoring process, for example, by drawing the armored tube through a die such that the armor layer (or at least a portion thereof) is reduced to snugly fit a tube internal to the cable (e.g., the inner tube) and to produce a fluid-tight seal along the length of the cable (or at least a portion thereof). For certain aspects, at any point prior to the formation of the seal, the internal tube may be coated with a material (e.g., fluorinated ethylene propylene (FEP)) to facilitate the forming of a seal with the armor layer.

Figure 2A:
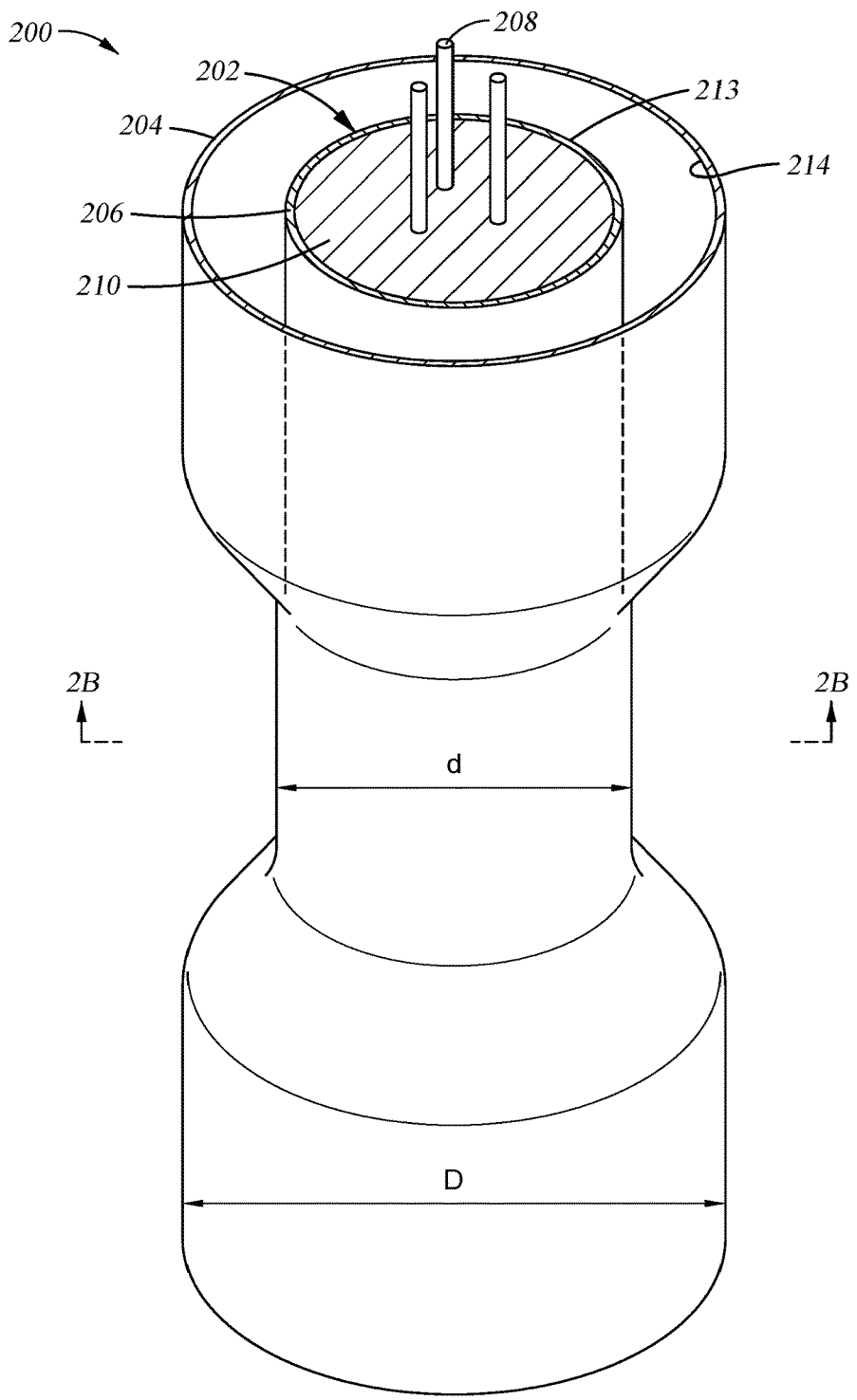
FIG. 2A is a longitudinal cross-sectional view of an example fiber optic cable suitable for use in downhole oil and gas applications with a fluid-tight annular seal, according to certain aspects of the present disclosure.
Figure 2B:
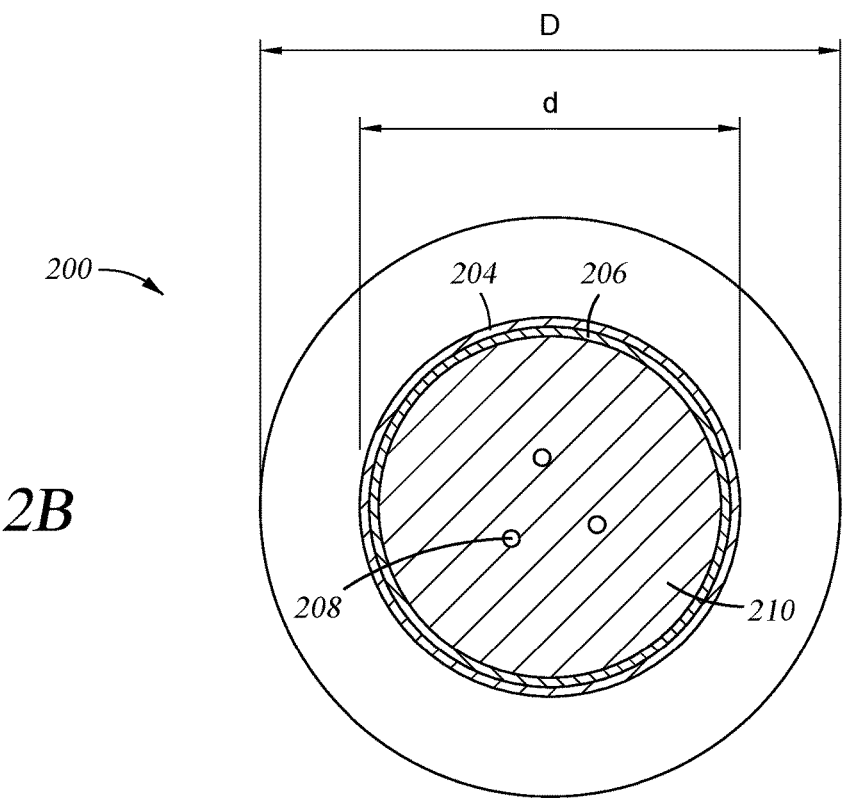
FIG. 2B is a transverse cross-sectional view of the fiber optic cable of FIG. 2A through line segment AA'.

FIGS. 2A and 2B illustrate an example of a fiber optic cable 200 with a fluid-tight annular seal in longitudinal and transverse cross-sections, respectively, according to certain aspects of the present disclosure. The cable 200 comprises a fiber in metal tube (FIMT) core 202 disposed in a protective outer tube 204 (e.g., an armor layer). The FIMT 202 comprises an inner tube 206 surrounding one or more optical fibers 208. Although three optical fibers 208 are shown in FIGS. 2A and 2B, the fiber optic cable 200 may include more or less than three optical fibers. A filler material 210 may be disposed in the inner tube 206 to fill the void spaces not occupied by the optical fibers 208.

For certain aspects, the inner tube 206 and the outer tube 204 may comprise the same material, such as the same metal or metal alloy. In other aspects the inner tube 206 and the outer tube 204 may comprise different materials, such as different metals or metal alloys.

The inner tube 206 may be fabricated from a corrosion-resistant material. Examples of suitable corrosion-resistant metal alloys include, but are not limited to, 304 stainless steel, 316 stainless steel, INCONEL® 625, and INCOLOY® 825, among others. Examples of suitable plastics include, but are not limited to fluoropolymers, ethylene-chlorotrifluoroethylene, fluoroethylenepropylene, polyvinylidene fluoride, polyvinylchloride, HALAR®, TEFLON®, and TEFZEL®, among others. The outer diameter of the inner tube 206 may be in the range of about 1.1 to about 4.2 mm, such as about 2.4 mm. Although the inner tube 206 is described as being about 1.1 to about 4.2 mm in diameter, the outer diameter of the inner tube 206 may vary, depending upon the materials used and the number of optical fibers 208 to be placed in the inner tube 206.

In one aspect, the inner tube 206 has a wall thickness suitable for a seam-welding process utilized to fabricate the tube from a coil of metal strip. For example, the wall thickness of a 304 stainless steel inner tube may be about 0.2 mm to facilitate a continuous laser weld during a tube-forming process. In another aspect, the inner tube 206 has a wall thickness suitable for fabrication by plastic extrusion.

In some sections of the fiber optic cable 200 for certain aspects, the outer tube 204 has an inner diameter D, which is greater than an outer diameter of the inner tube 206. In these sections, there may be a gap (e.g., an annulus) between the outer tube 204 and the inner tube 206. In other sections of the fiber optic cable 200, the outer tube 204 has an inner diameter d that is equal to the outer diameter of the inner tube 206. In the one or more areas where d is equal to the outer diameter of the inner tube 206, the outer tube 204 tightly surrounds the inner tube 206, forming one or more fluid-tight annular seals between the outer tube 204 and the inner tube 206 to prevent fluid flow (e.g., the flow of hydrogen gas) therebetween, at least along the portion(s) of the fiber optic cable 200 with the seal(s).

For certain aspects, the fluid-tight annular seals may be distributed intermittently throughout a length of the optical cable (i.e., the outer tube 204 intermittently sealingly contacts the inner tube 206 along this length). For other aspects, the fluid-tight annular seal may be continuous, at least along one or more portions of the optical cable (i.e., the outer tube 204 continuously sealingly contacts the inner tube 206 along these portions or the entire length of the optical cable). In certain aspects, both intermittent and continuous fluid-tight annular seals may be employed in different areas of the optical cable.

The fluid-tight annular seal may be made or enhanced by an optional coating (not shown) to facilitate the forming of a seal between the inner tube 206 and the outer tube 204. The optional coating may be disposed on at least one of the inner surface 214 of the outer tube 204 or the outer surface 213 of the inner tube 206. The coating may be applied to the surface(s) 213, 214 at any point prior to the reduction in the diameter of the outer tube 204 to form the mechanical seal. The coating may be coated, plated, or otherwise applied in any suitable manner and may comprise a low hydrogen permeability material, such as tin (Sn), aluminum (Al), or other suitable material.

A filler material 210 may be disposed in the inner tube 206 and substantially fill the void spaces within the inner tube 206 surrounding the optical fibers 208 to support and prevent the optical fibers 108 from moving excessively within the inner tube 206. The filler material 210 has sufficient viscosity to resist the shear forces applied thereto as a result of the weight of the optical fibers 208 when disposed in a vertical well installation at elevated temperatures, thereby supporting the optical fibers 208 without subjecting the fibers to the strain of their own weight. The filler material 210 has an operating temperature range of about 10 to about 200° C. However, the cable 200 may be utilized over a wider temperature range.

The filler material 210 may also be configured to allow the optical fibers 208 to relax and straighten with respect to the inner tube 206 due to differences in the coefficients of thermal expansion between the optical fiber 208 and the inner tube 206 and during spooling, deployment, and use of the cable 200. The filler material 210 may also prevent chaffing of the coatings on the optical fibers 208 as a result of bending action during installation and vibration of the cable 200. The filler material 210 may also serve as cushion for the optical fiber 208 against the surface of the inner tube 206 to avoid microbend losses across cable bends. Suitable filler materials 210 include thixotropic gels or grease compounds, some of which are commonly used in the fiber optic cable industry for water blocking, filling, and lubrication of optical fiber cables. Optionally, the filler material 210 may be omitted for certain aspects.

The optical fibers 208 are selected to provide reliable transmission of optical signals through the cable 200 when disposed in a wellbore, for example. Suitable optical fibers 208 include low defect, pure silica core/depressed clad fiber. Alternatively, suitable optical fibers 208 include germanium-doped single-mode fiber or other optical fiber suitable for use in a high temperature, high pressure environment. The optical fibers 208 disposed within the inner tube 206 may be composed of the same type or of different types of materials. The total number of fibers 208 and the diameter of the inner tube 206 may be selected to provide sufficient space to prevent microbending of the optical fibers 208 during handling and deployment of the cable 200.

As the fiber optic cable 200 has an operating temperature ranging at least between about 10° C. to about 200° C. or higher, a greater length of optical fibers 208 may be disposed per unit length of inner tube 206 to account for the different coefficients of thermal expansion (CTEs) possessed by the optical fibers 208 and the inner tube 206. The inner diameter of the inner tube 206 is configured to accept an excess length of "serpentine over-stuff" of optical fiber 208 within the inner tube 206. In one aspect, the excess length of optical fiber 208 may be achieved by inserting the fiber 208 while the inner tube 206 is at an elevated temperature, for example, during laser welding of the inner tube 206. The temperature of the inner tube 206 is controlled such that it approximates the anticipated maximum of normal operating temperature for the final installation. In another aspect, the excess length of fiber 208 may be achieved by inserting the fiber 208 at a faster rate than the inner tube 206 is moving on the welding line. This process may lead to an excess length of fiber 208 of up to 2.0% or more within the inner tube 206 after cooling of the inner tube 206, but typically in the range 0.3% to 0.6%.

The outer tube 204 may be manufactured of a corrosion-resistant material that easily diffuses hydrogen. The outer tube 204 may be manufactured of the same material as the inner tube 206 and may be fabricated with or without a coating of a low hydrogen permeability coating or hydrogen-scavenging material. Examples of outer tube materials include suitable corrosion-resistant metal alloys such as, but not limited to, 304 stainless steel, 316 stainless steel, INCONEL® 625, and INCOLOY® 825, among others.

In one aspect, the outer tube 204 is seam welded over the FIMT core 202. The weld seam of the outer tube 204 may be fabricated using a tungsten inert gas (TIG) welding process, a laser welding process, or any other suitable process for joining the outer tube 204 over the FIMT core 202.

Additionally, the outer tube 204 may be rolled or drawn down against the FIMT core 202, where care is taken not to extrude or stretch the FIMT core 202 such that the excess length of the fibers 208 within the FIMT core 202 is not appreciably shortened. In aspects where the outer tube 204 and the FIMT core 202 are configured to form one or more fluid-tight annular seals with the inner tube to prevent fluid flows, the inner and outer tubes 206, 204 may be fabricated from the same material to minimize differences in thermal expansion.

An initial inner diameter of the outer tube 204 may be selected with sufficient space so as not to damage the FIMT core 202 during welding. The outer tube 204 may be drawn down to a final outer diameter after welding. In one aspect, the outer tube 204 has a final outer diameter D of less than about 3/16 inch to less than about 1/4 inch and has a wall thickness in the range of about 0.7 to about 1.2 mm.

Figure 2C:
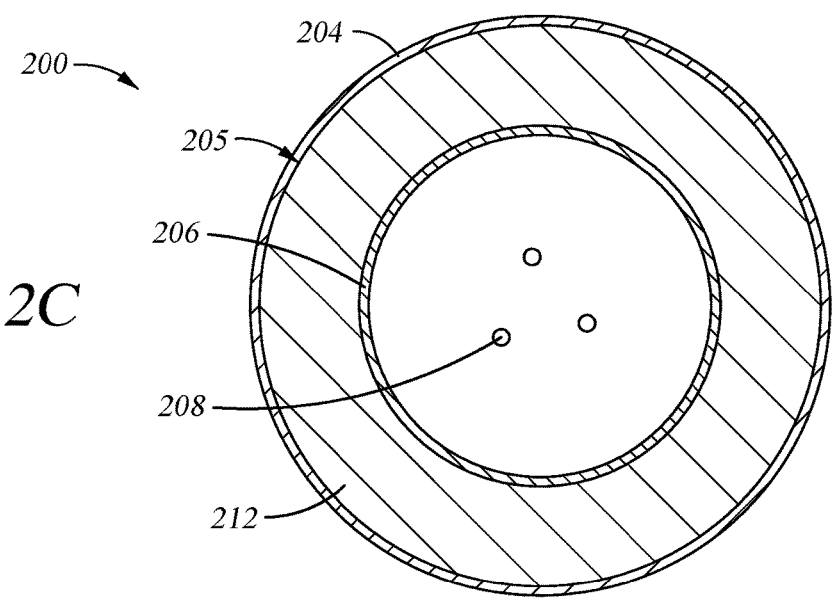
FIG. 2C is a transverse cross-sectional view of an example fiber optic cable with a fluid-tight annular seal and a buffer layer disposed between an outer tube and an inner tube, according to certain aspects of the present disclosure.

For certain aspects, a buffer layer 212 (e.g., analogous to buffer material 112) is disposed between the outer tube 204 and the inner tube 206 as illustrated in the transverse cross-sectional view of FIG. 2C. The buffer layer 212 provides a mechanical link between the inner tube 206 and the outer tube 204 to prevent the inner tube 206 from sliding within the outer tube 204. Additionally, the buffer layer 212 keeps the inner tube 206 generally centered within the outer tube 204 and protects the inner tube 206 and any coatings formed thereon from damage due to vibrating against the outer tube 204. In this case, the fluid-tight annular seal 205 may be created between the inner surface of the outer tube 204 and the outer surface of the buffer layer 212. The fluid-tight annular seal may be created in a similar manner as described above, where the buffer layer 212 surrounding the FIMT core 202 replaces the FIMT core alone in the description of FIGS. 2A and 2B.

For certain aspects, any separation in particular sections of the fiber optic cable 200 between the buffer layer 212 and the outer tube 204 creates an outer annular flow path (e.g., analogous to path 110 in FIG. 1), whereas spacing between the inner tube 206 and the buffer layer 212 provides an inner annular flow path (e.g., analogous to path 116 in FIG. 1). In these sections, the buffer layer 212 isolates the inner annular flow path from the outer annular flow path, at least until cross-over is desired.

Fiber Optic Cable with Polymer Sealing

Certain aspects of the present disclosure provide a polymer layer bonded between the inner tubing and the armor layer (e.g., the outer tube) of an optical cable to prevent, or at least impede, corrosion and inhibit the propagation of fluid that may breach the armor layer or other outer tube. As used herein and understood by a person having ordinary skill in the art, the term "fluid" generally refers to a liquid or a gas. Although polymers have been used in optical cables, a polymer has not previously been used to form a bond between the armor layer and the inner tube. Expandable foams have been used as insulating and/or centralizing layers, but such foams do not form a strong bond between the armor layer and the inner tube or a significant protective layer for the inner tubing.

The polymer layer may coat the inner tube to prevent any ingressing fluids from contacting the inner tube over much of the inner tube's length, hence inhibiting corrosion of the inner tube and the production of hydrogen therefrom. The polymer layer may also form a bond between the armor layer and the inner tube such that the polymer material produces a pressure barrier that inhibits the propagation of fluids up or down the cable from the point of ingress. Examples of suitable polymer materials include epoxies and silicone adhesives. To manufacture the cable, the polymer material may be pumped into an annulus between the armor layer and the inner tube, perhaps using a vacuum pump to evacuate the annulus prior to inserting the polymer material. The polymer material may then be cured inside the cable through any of various suitable techniques, such as thermal curing or an addition reaction. The polymer material may form a strong bond to the armor and/or inner tube, not crack under bending or stretching of the cable, be resistant to any chemical attack from ingressing fluid, and retain its physical properties, including at the maximum operating temperatures of the cable.

Figure 3A:
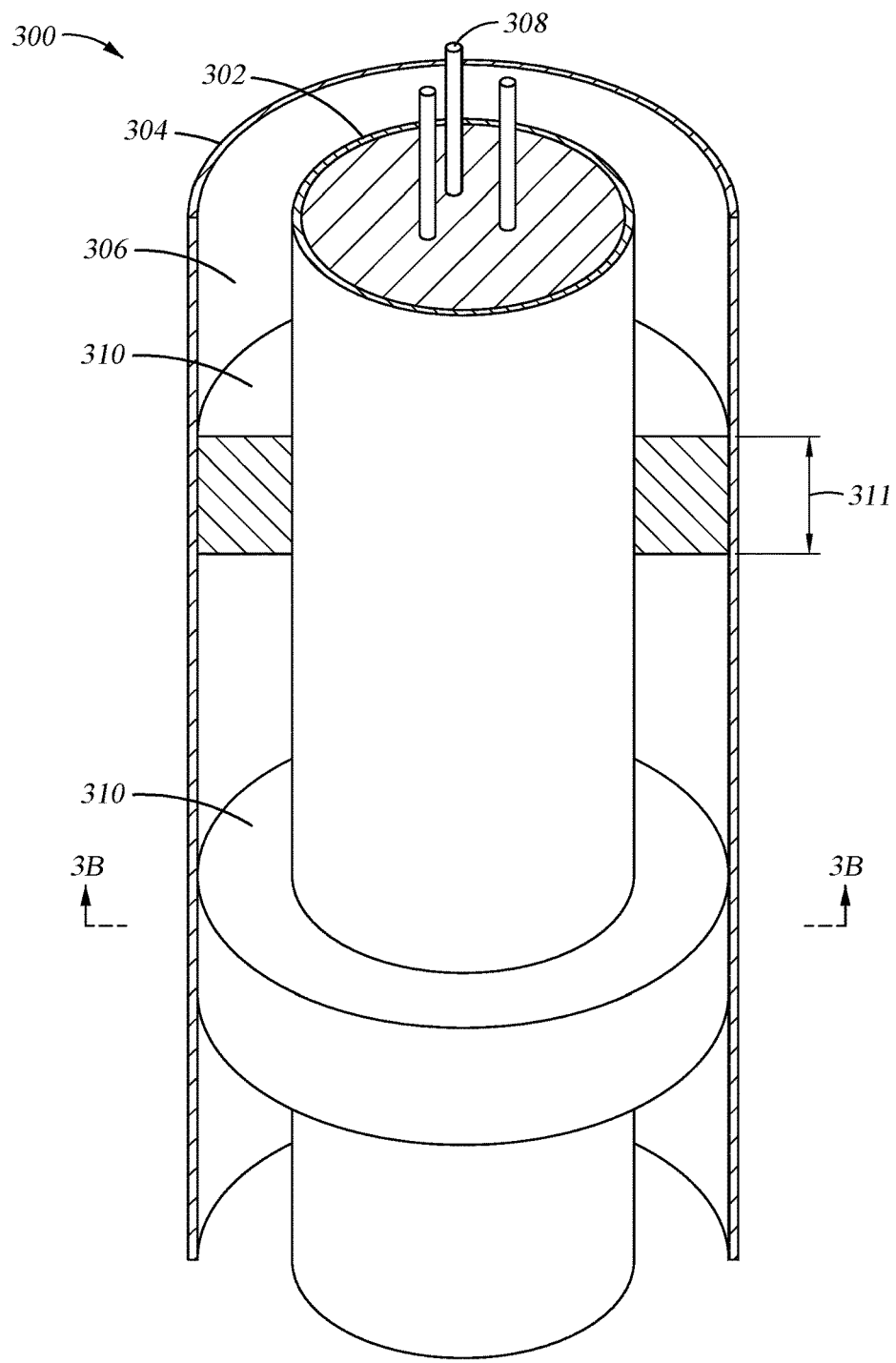
FIG. 3A is a longitudinal cross-sectional view of an example fiber optic cable suitable for use in downhole oil and gas applications with one or more polymer sealing features, according to certain aspects of the present disclosure.
Figure 3B:
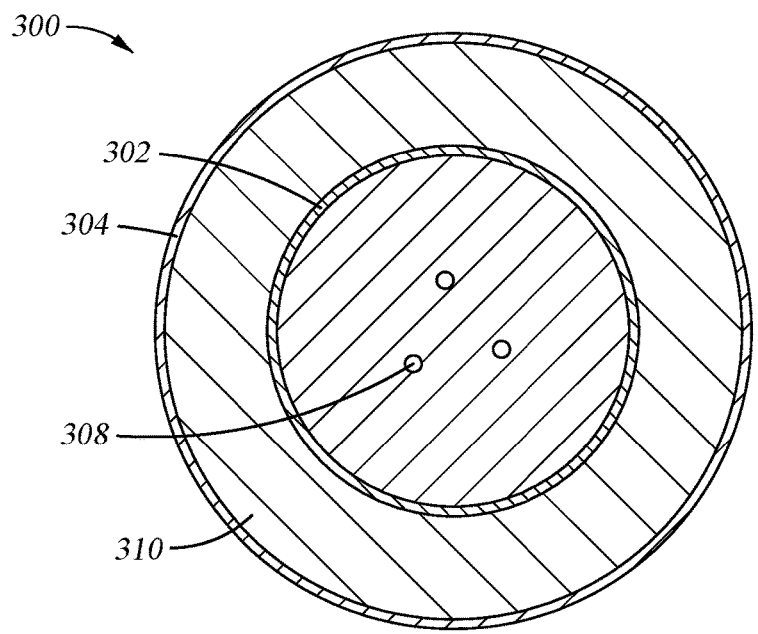
FIG. 3B is a transverse cross-sectional view of the fiber optic cable of FIG. 3A through line segment BB'.

FIGS. 3A and 3B illustrate in longitudinal and transverse cross-sections, respectively, an example fiber optic cable 300 with polymer sealing, according to certain aspects of the present disclosure. In the cable 300, one or more optical fibers 308 are surrounded by an inner tube 302 (e.g., in a FIMT core, analogous to FIMT core 202), and the inner tube 302 is surrounded by an outer tube 304 (e.g., a protective armor layer, analogous to outer tube 204). The inner diameter of the outer tube 304 is configured to create an annulus 306 between the outer tube 304 and the inner tube 302. One or more polymer sealing features 310 are disposed in the annulus 306.

The one or more polymer sealing features 310 may fill the annulus 306 in one or more sections 311 of the fiber optic cable 300. The one or more polymer sealing features 310 may be bonded to an outer surface of the inner tube 302, an inner surface of the outer tube 304, or both. The bonding of the polymer sealing feature 310 to the inner and/or outer tube 302, 304 helps to prevent fluid flow (e.g., the flow of hydrogen gas) in the annulus 306 along the length of the fiber optic cable 300, thereby confining fluid flow breaching the outer tube 304 to a small region between consecutive polymer sealing features 310. The polymer sealing features 310 may be mechanically or thermally bonded to the inner and/or outer tubes 302, 304. The polymer sealing features 310 may be fabricated from, but are not limited to fluoropolymers, ethylene-chlorotrifluoroethylene, fluoroethylenepropylene, polyvinylidene fluoride, polyvinylchoride, HALAR®, TEFLON®, TEFZEL®, and polytetrafluoroethylene (PTFE), among others. For certain aspects, the polymer sealing feature(s) 310 may comprise a compressible material disposed around the inner tube 302. In this case, the compressible material may be wound around the inner tube 302. In other aspects, the polymer sealing feature(s) 310 may be composed of a cured material that is disposed around the inner tube 302.

Figure 3C:
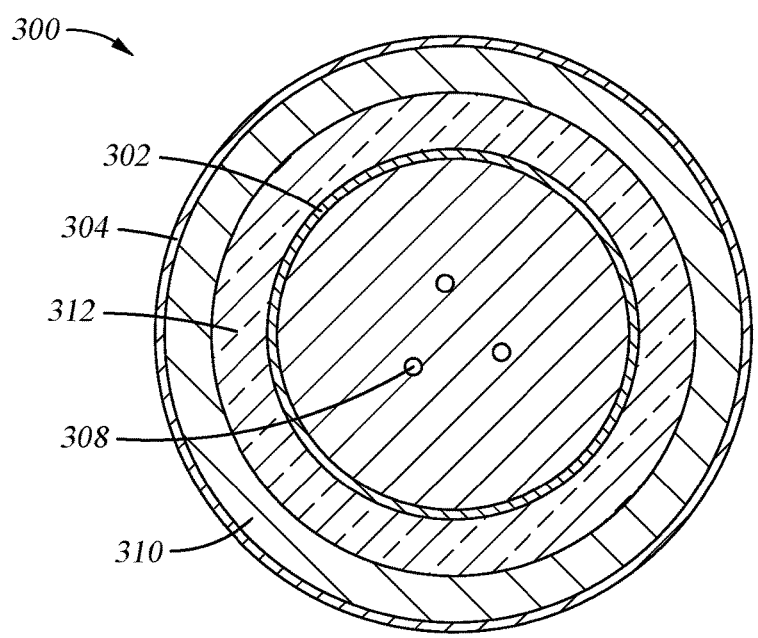
FIG. 3C is a transverse cross-sectional view of an example fiber optic cable with a buffer layer disposed between an outer tube and an inner tube and a polymer sealing feature disposed between the outer tube and the buffer layer, according to certain aspects of the present disclosure.

For certain aspects, the fiber optic cable 300 may also include another tube 312 disposed between the outer tube 304 and the inner tube 302, as illustrated in the transverse cross-sectional view of FIG. 3C. For example, this other tube 312 may be a buffer layer, which may be analogous to the buffer layer 212 in FIG. 2C. In this case, the polymer sealing feature(s) 310 may be disposed in an annulus between the outer tube 304 and the other tube 312 (as shown), in an annulus between the other tube 312 and the inner tube 302, or both. The polymer sealing feature(s) 310 may be bonded to the outer tube 304, to the inner tube 302, to an outer surface of the other tube 312, to an inner surface of the other tube 312, or any combination thereof. Different axial sections of the fiber optic cable 300 may have different arrangements of polymer sealing feature(s) 310 with respect to radial location and/or bonding.

Fiber Optic Cable with Feedthrough-Encapsulated Filler Material

Certain aspects of the present disclosure utilize a full or at least nearly full (close to 100%, such as within 5%) material fill of a tube containing the optical fiber(s) (the fiber tube) to prevent the pressure buildup of fluid in the cable, which might otherwise allow the fluid to push its way along the fiber tube. The filler material may include any of various suitable materials (e.g., a gel or liquid) capable of preventing ingressing fluid from pushing its way up the tubing as the pressure increases. To prevent propagation of the ingressing fluid with built-up pressure, the material fill may be full or close to 100% full in certain sections. For certain aspects, the filler material may allow the optical fibers to move sufficiently to allow the fiber overstuff (i.e., the excessive fiber length) to accommodate thermal expansion of the cable with increased temperature. For certain aspects, the filler material may be largely incompressible to prevent the fluid pressure buildup from compressing the filler material down a significant proportion of the cable. For certain aspects, the filler material may have adhesive properties that help suppress any pressure buildup. For fabricating the optical cable, the filler material may initially be a low viscosity fluid that is pumped or otherwise injected into the fiber tube and then may be, for example, cured or otherwise processed to achieve its final properties. For certain aspects, it may be possible to cut the fiber tube and remove the exposed section of filler material from the fiber tube to allow splicing or termination of the optical fibers at cable joints or terminations.

For certain aspects, the resistance of the filler material to the pressure buildup may be aided by fiber feedthroughs that hold back the pressure and/or prevent movement of the filler material. In conventional cable designs, filler material can be pushed aside by ingressing fluid as the pressure builds up, allowing the ingressing fluid to propagate up and down the cable. Unlike conventional designs, the fiber feedthroughs in certain aspects of the present disclosure need not provide a leak-free seal to fluids, but may be designed simply to prevent significant leakage of the filler material. The fiber feedthroughs may be disposed, for example, at the ends of cable sections to provide a pressure barrier or at least a backstop to inhibit significant leakage of the filler material from the cable under any internal cable pressure buildup due to an ingressing fluid. The filler material, either on its own or in combination with the fiber feedthrough, should prevent, or at least impede, the progression of the ingressing fluid down the fiber tube.

Figure 4A:
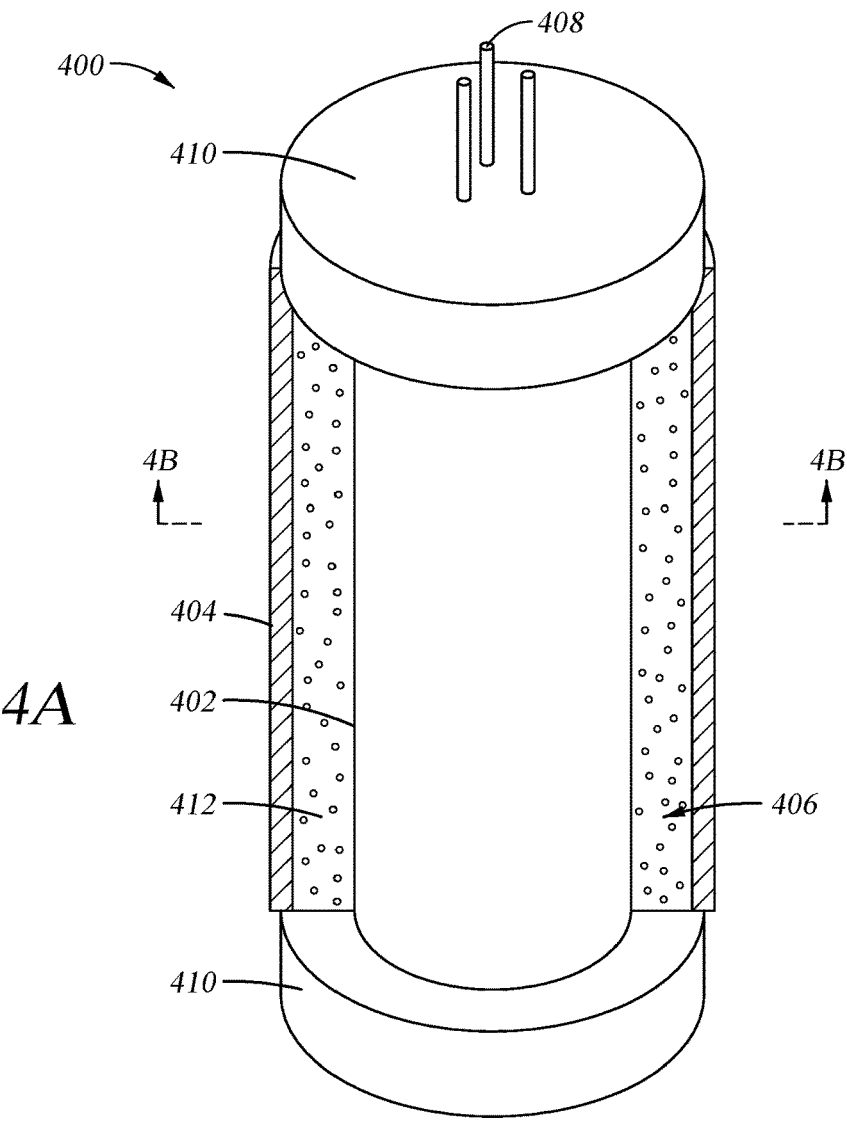
FIG. 4A is a longitudinal cross-sectional view of an example fiber optic cable suitable for use in downhole oil and gas applications with feedthrough-encapsulated filler material, according to certain aspects of the present disclosure.
Figure 4B:
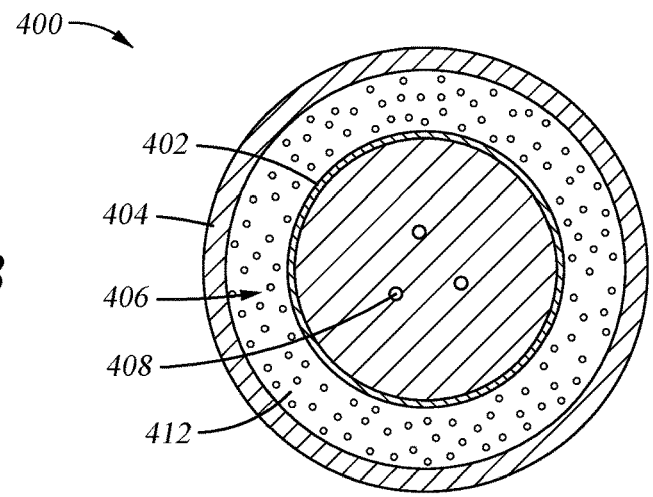
FIG. 4B is a transverse cross-sectional view of the fiber optic cable of FIG. 4A through line segment CC'.

FIGS. 4A and 4B illustrate in longitudinal and transverse cross-sections, respectively, an example fiber optic cable 400 with feedthrough-encapsulated filler material, according to certain aspects of the present disclosure. In the cable 400, one or more optical fibers 408 are surrounded by an inner tube 402 (e.g., in a FIMT core, analogous to FIMT core 202), and the inner tube 402 is surrounded by an outer tube 404 (e.g., a protective armor layer, analogous to outer tube 204). The inner diameter of the outer tube 404 is configured to create an annulus 406 between the outer tube 404 and the inner tube 402. A filler material 412 may be disposed in the annulus 406 between the inner tube 402 and the outer tube 404 (as illustrated in FIG. 4A. Additionally or alternatively, filler material may be disposed in the inner tube 402 (e.g., analogous to filler material 210 the FIMT core 202 in FIGS. 2A and 2B). The filler material in the inner tube 402 may be the same or a different material from the filler material 412 in the annulus 406. Fiber feedthroughs 410 are configured to encapsulate the filler material 412 in the inner tube 402, the annulus 406, or both while still permitting the fibers 408 to pass therethrough and extend the length of the fiber optic cable 400. The filler material 412 is configured to impede the flow of an ingressing fluid along at least a portion of the length of the fiber optic cable 400 that includes the filler material. For certain aspects, the filler material 412 completely fills (or at least nearly completely fills) the inner tube 402, the annulus 406, or both. As described above, the filler material 412 may comprise a gel or a liquid, for example.

Figure 5A:
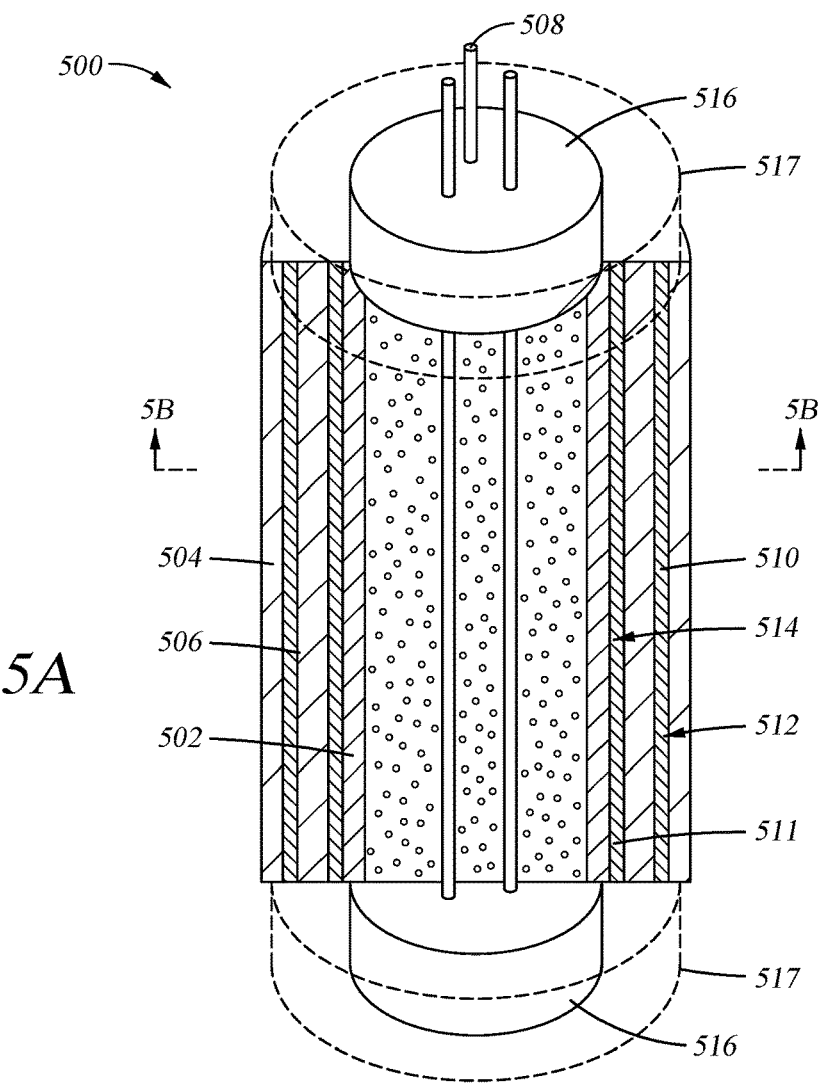
FIG. 5A is a longitudinal cross-sectional view of an example fiber optic cable suitable for use in downhole oil and gas applications with a buffer layer and feedthrough-encapsulated filler material, according to certain aspects of the present disclosure.
Figure 5B:
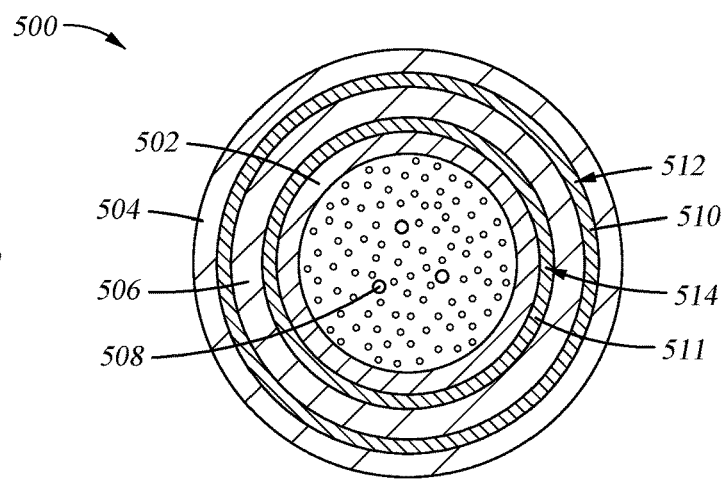
FIG. 5B is a transverse cross-sectional view of the fiber optic cable of FIG. 5A through line segment DD'.

FIGS. 5A and 5B illustrate in longitudinal and transverse cross-sections, respectively, an example fiber optic cable 500 with a buffer layer and feedthrough-encapsulated filler material, according to certain aspects of the present disclosure. In the fiber optic cable 500, one or more optical fibers 508 are surrounded by an inner tube 502 (e.g., in a FIMT core, analogous to FIMT core 202). The inner tube 502 is surrounded by a buffer tube 506 (e.g., analogous to the buffer layer 212), and the buffer tube 506 is surrounded by an outer tube 504 (e.g., a protective armor layer, analogous to outer tube 204). With the addition of the buffer tube 506 an inner annulus 514 is created between the buffer tube 506 and the inner tube 502, and an outer annulus 512 is created between the buffer tube 506 and the outer tube 504.

In some aspects, a filler material 510 may be disposed in the outer annulus 512. For certain aspects, a filler material 511 may be disposed in the inner annulus 514. The filler material 510 and/or 511 is configured to impede the flow of an ingressing fluid along at least a portion of the length of the fiber optic cable 500. Fiber feedthroughs 516 are configured to encapsulate the filler material 510 and/or 511 in at least a portion of either the outer annulus 512 or the inner annulus 514, respectively. As illustrated in FIG. 5A, the fiber feedthroughs 516 may encapsulate only the filler material 511 in the inner annulus 514. However, as illustrated by the dashed lines 517, the fiber feedthroughs 516 for other aspects may have a larger diameter sufficient to encapsulate the filler material 510 and/or 511 in the respective annuli 512 and/or 514. The filler material 510 may comprise a gel or a liquid (e.g., a low viscosity liquid). The filler material 510 may be curable. Additionally, the filler material 510 and/or 511 may completely (or nearly completely) fill either or both of the outer annulus 512 or the inner annulus 514, respectively.

To further reduce the effects of hydrogen on the optical fibers 508, the filler material 510 may optionally include or be impregnated with a hydrogen absorbing/scavenging material, such as palladium or tantalum, and the like. For example, the hydrogen absorbing/scavenging material may be a vanadium-titanium wire coated with palladium. Alternatively, the buffer tube 506 and/or the inner tube 502 may be coated with a hydrogen absorbing/scavenging material below an optional coating or on the interior surface of the buffer tube 506 and/or the inner tube 502, or such a hydrogen absorbing/scavenging material may be impregnated into the tube material, or any combination of the above.

Figure 6:
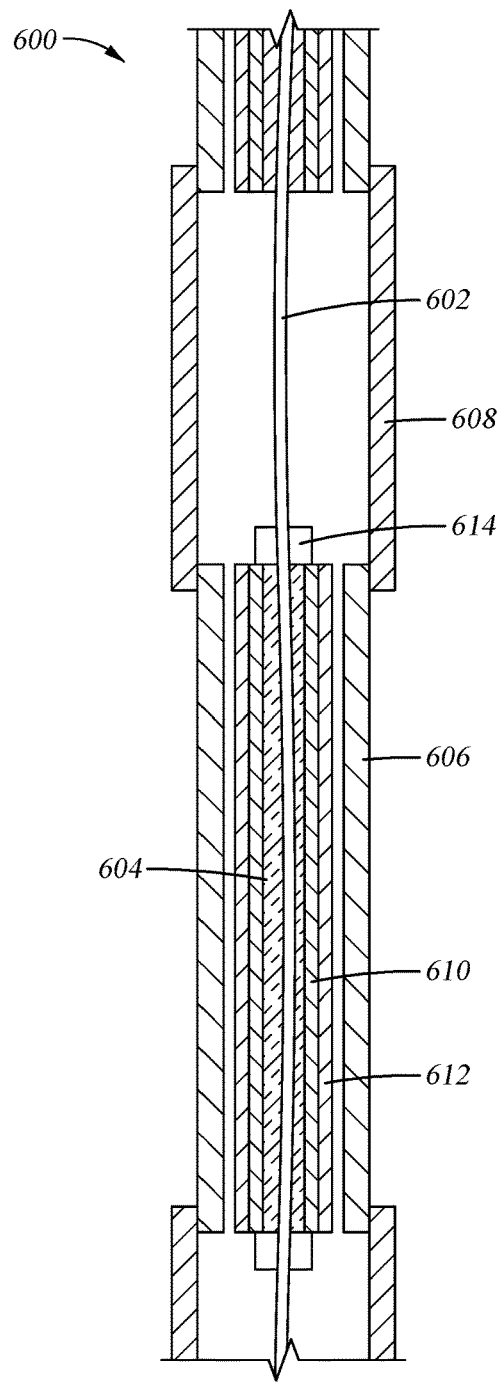
FIG. 6 is a longitudinal cross-sectional view of an example fiber optic cable suitable for use in downhole oil and gas applications with a buffer layer and feedthrough-encapsulated filler material, according to certain aspects of the present disclosure.

FIG. 6 is a longitudinal cross-sectional view of an example fiber optic cable 600 suitable for use in downhole oil and gas applications with a buffer tube and feedthrough-encapsulated filler material, according to certain aspects of the present disclosure. The cable 600 includes multiple sections (two sections are shown), where adjacent sections may be joined by a cable splice tube 608 (a cable joint). The cable 600 is somewhat similar in construction to the cable 500 described above, having a FIMT core comprising one or more optical fibers 602 surrounded by an inner tube 610 (e.g., analogous to the inner tube 502) disposed within a buffer tube 612 (e.g., analogous to the buffer tube 506). The buffer tube 612 is disposed within a protective outer tube 606 (e.g., analogous to the outer tube 504). A filler material 604 is disposed in the inner tube 610 and may substantially fill the void spaces within the inner tube surrounding the optical fibers 602 to prevent, or at least impede, propagation of an ingressing fluid due to increased pressure. For certain aspects, the filler material 604 may also include a hydrogen absorbing/scavenging material to minimize the effects of hydrogen on the optical performance of the optical fibers 602. A pair of fiber feedthroughs 614 may encapsulate the filler material 604 in the inner tube 610 for one or more sections of the fiber optic cable 600. Other sections of the cable 600 may not include fiber feedthroughs, as shown.

Figure 7:
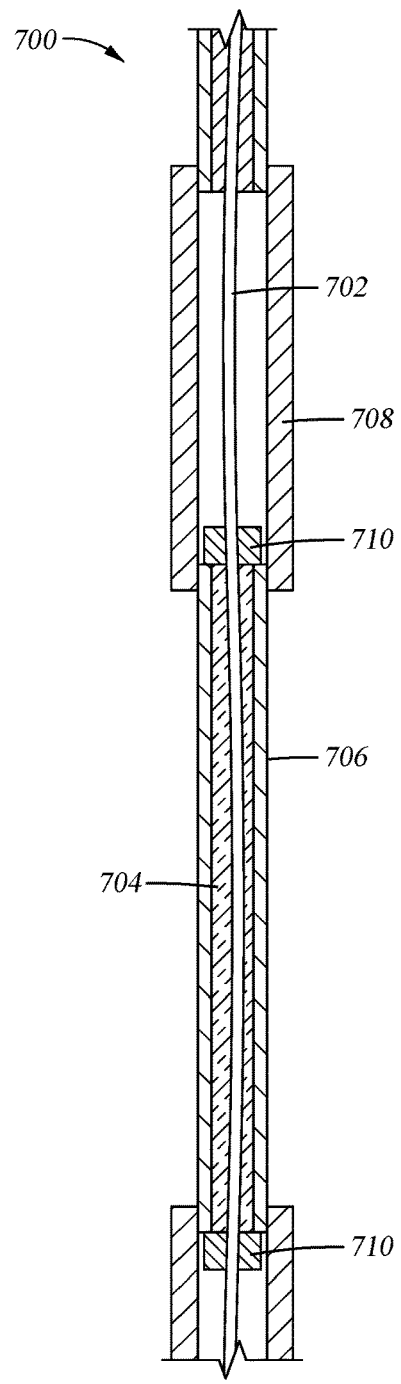
FIG. 7 is a longitudinal cross-sectional view of an example fiber optic cable suitable for use in downhole oil and gas applications with feedthrough-encapsulated filler material, according to certain aspects of the present disclosure.

FIG. 7 is a longitudinal cross-sectional view of an example fiber optic cable 700 suitable for use in downhole oil and gas applications with feedthrough-encapsulated filler material, according to certain aspects of the present disclosure. The cable 700 includes multiple sections (two sections are shown), where adjacent sections may be joined by a cable splice tube 708 (a cable joint). Each section of the cable 700 may include one or more optical fibers 702 surrounded by a protective tube 706, thereby forming a FIMT. A filler material 704 (e.g., somewhat analogous to the filler material 412) is disposed in the tube 706 and may substantially fill the void spaces within the tube surrounding the optical fibers 702 to not only support and prevent the optical fibers 702 from moving excessively within the tube 706, but also to prevent, or at least impede, propagation of an ingressing fluid with built-up pressure. For certain aspects, the filler material 704 may also include a hydrogen absorbing/scavenging material to minimize the effects of hydrogen on the optical performance of the optical fibers 702. A pair of fiber feedthroughs 710 may encapsulate the filler material 704 in the tube 706 for one or more sections of the fiber optic cable 700. Other sections of the cable 700 may not include fiber feedthroughs, as shown.

While the foregoing is directed to aspects of the present disclosure, other and further aspects of the present disclosure may be devised without departing from the basic scope thereof, and the scope thereof is determined by the claims that follow.

The invention claimed is:

1. An optical cable suitable for downhole use, comprising:
one or more optical fibers;
an inner tube surrounding the one or more optical fibers;
an outer tube surrounding the inner tube, wherein one or more of the inner tube and the outer tube comprise a metallic material; and
one or more polymer sealing features disposed in an annulus between the outer tube and the inner tube and bonded to at least one of the inner tube or the outer tube to prevent fluid flow in the annulus along at least a portion of a length of the optical cable.

2. The optical cable of claim 1, wherein the one or more polymer sealing features comprise a compressible material disposed around the inner tube.

3. The optical cable of claim 2, wherein the compressible material comprises polytetrafluoroethylene (PTFE).

4. The optical cable of claim 2, wherein the compressible material is wound around the inner tube.

5. The optical cable of claim 1, wherein the one or more polymer sealing features comprise a cured material disposed around the inner tube.

6. The optical cable of claim 1, wherein the one or more polymer sealing features are mechanically or thermally bonded to the at least one of the inner tube or the outer tube.

7. The optical cable of claim 1, further comprising another tube surrounding the one or more optical fibers, wherein the inner tube surrounds the other tube and wherein the inner tube comprises a buffer layer between the outer tube and the other tube.

* * * * *